(12) United States Patent
Kukshya et al.

(10) Patent No.: US 7,994,905 B2
(45) Date of Patent: Aug. 9, 2011

(54) TIRE PRESSURE MONITORING (TPM) SYSTEM AND METHOD OF OPERATING THE SAME

(75) Inventors: Vikas Kukshya, Oak Park, CA (US); Hyok J. Song, Camarillo, CA (US); Hui-Pin Hsu, Northridge, CA (US); Richard W. Wiese, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 369 days.

(21) Appl. No.: 12/331,484

(22) Filed: Dec. 10, 2008

(65) Prior Publication Data

US 2010/0141416 A1 Jun. 10, 2010

(51) Int. Cl.
*B60C 23/00* (2006.01)

(52) U.S. Cl. .......................... 340/447; 340/445

(58) Field of Classification Search .................. 340/442, 340/444, 445, 447, 449, 505; 73/146.5; 152/416
See application file for complete search history.

(56) References Cited

U.S. PATENT DOCUMENTS

| | | | | |
|---|---|---|---|---|
| 6,630,885 B2 * | 10/2003 | Hardman et al. | | 340/505 |
| 7,679,502 B2 * | 3/2010 | Fukumori | | 340/447 |
| 7,705,719 B2 * | 4/2010 | Mori et al. | | 340/447 |
| 7,750,798 B2 * | 7/2010 | Mori | | 340/447 |
| 7,817,026 B2 * | 10/2010 | Watabe et al. | | 340/447 |

* cited by examiner

*Primary Examiner* — Van T. Trieu
(74) *Attorney, Agent, or Firm* — Lionel D. Anderson; Reising Ethington P.C.

(57) ABSTRACT

There is provided an exemplary tire pressure monitoring (TPM) system that can use a half-duplex wireless link to communicate between one or more wheel-mounted sensor units and a vehicle-mounted transceiver unit. The half-duplex wireless link enables the sensor units to report sensor readings to the transceiver unit, and it enables the transceiver unit to make configuration changes to the sensor units for improved communication. Some examples of wireless settings that can be modified include modulation settings, data encoding/decoding settings, error correction settings, and transmission power settings.

25 Claims, 2 Drawing Sheets

TIRE PRESSURE MONITORING (TPM) SYSTEM AND METHOD OF OPERATING THE SAME

TECHNICAL FIELD

The present invention generally relates to tire pressure monitoring (TPM) systems on a vehicle and, more particularly, to wireless communication techniques for TPM systems.

BACKGROUND

TPM systems have been used in a variety of vehicles, and in some cases are mandated by government regulations, vehicle manufacturer specifications and/or other requirements. For example, the Transportation Recall Enhancement Accountability and Documentation Act (also known as the TREAD Act) is a U.S. law that requires most new vehicles under 10,000 pounds of gross vehicle weight to be equipped with a TPM system that can alert a driver when the pressure in one of the tires falls below a certain level.

A conventional TPM system typically includes a battery-powered tire pressure sensor capable of radio frequency (RF) signal broadcast located at each vehicle wheel and a signal receiver located elsewhere on the vehicle. The tire pressure sensors transmit information regarding tire pressure and/or other readings over a one-way wireless link that connects the tire pressure sensors with the vehicle-mounted signal receiver. Typically, the one-way wireless link uses a fixed communications protocol and a fixed modulation scheme.

SUMMARY OF THE INVENTION

According to one embodiment, there is provided a method of operating a tire pressure monitoring (TPM) system for a vehicle. The method comprises the steps of: (a) assessing wireless communication within the TPM system; (b) if the wireless communication is not satisfactory, then selecting a wireless setting from a plurality of choices; (c) configuring a component of the TPM system with the wireless setting; and (d) wirelessly communicating with the component of the TPM system.

According to another embodiment, there is provided a method of operating a tire pressure monitoring (TPM) system for a vehicle. The method comprises the steps of: (a) sending a first wireless communication from a transceiver unit located at a vehicle to a sensor unit located at a vehicle wheel; (b) sending a second wireless communication from the sensor unit to the transceiver unit, and (c) establishing two-way wireless communication between the wireless sensor module and the sensor unit.

According to another embodiment, there is provided a tire pressure monitoring (TPM) system for a vehicle. The TPM system comprises: a sensor unit that is mounted on a vehicle wheel and can both send and receive wireless communications; a transceiver unit that is mounted on the vehicle and can both send and receive wireless communications; and a half-duplexed wireless link established between the sensor unit and the transceiver unit.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
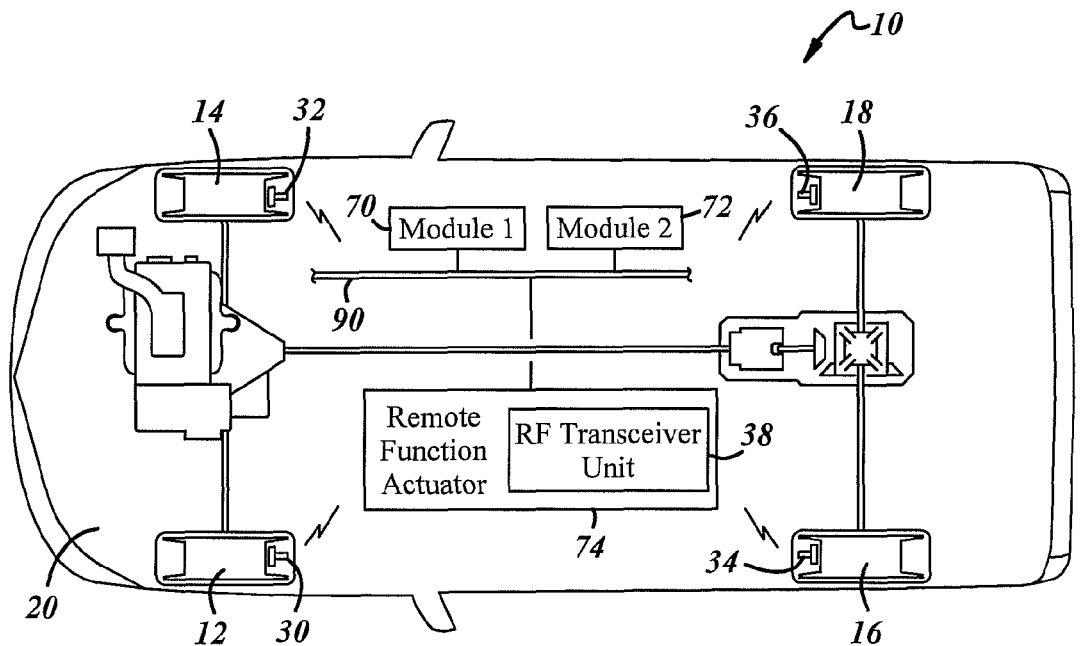
FIG. 1 is a schematic view of an exemplary TPM system that is mounted on a vehicle and includes four sensor units (one located at each wheel) and a transceiver unit.
Figure 2:
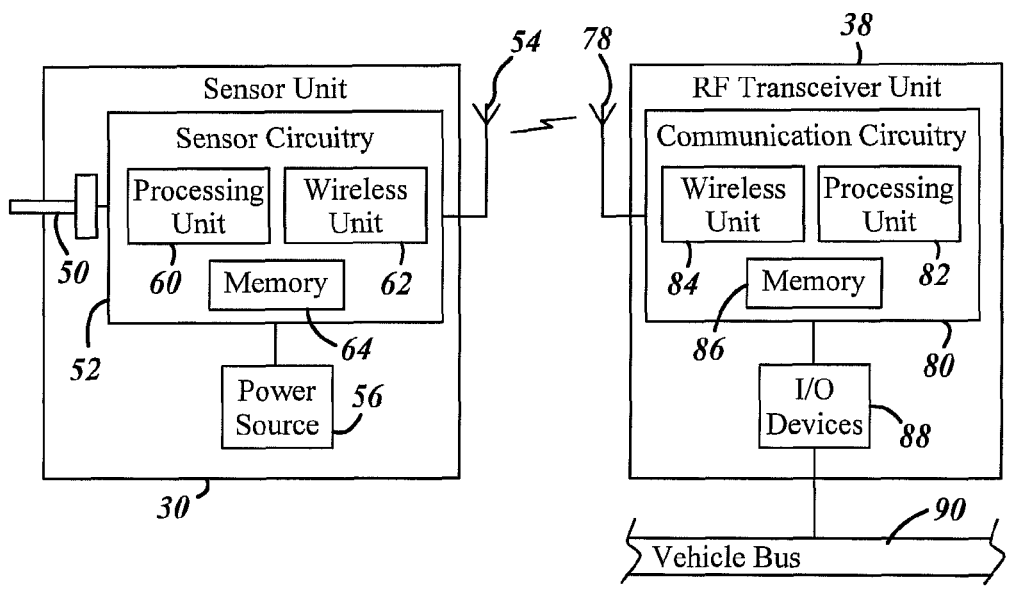
FIG. 2 is a more detailed schematic view of the exemplary TPM system of FIG. 1 where, for purposes of illustration, only a single sensor unit and the transceiver unit are shown.

With reference to FIGS. 1 and 2, there is shown an exemplary tire pressure monitoring (TPM) system 10 that may use a half-duplex wireless link to communicate between one or more wheel-mounted sensor units 30-36 and a vehicle-mounted transceiver unit 38. The half-duplex wireless link enables sensor units 30-36 to report sensor readings to transceiver unit 38, and it enables the transceiver unit to make configuration changes to the sensor units for improved communication. For example, if TPM system 10 encounters adverse operating conditions inside or outside of the vehicle, transceiver unit 38 can make real-time configuration changes at the software and/or hardware level in order to address those conditions. Although the following description is in the context of a particular TPM system 10, it should be appreciated that this system is merely exemplary and that other TPM systems known in the art could also be used. According to this embodiment, TPM system 10 includes sensor units 30-36 and a transceiver unit 38.

Sensor units 30-36 are respectively mounted at vehicle wheels 12-18 and are designed to take one or more types of readings, such as tire pressure readings, and wirelessly communicate those readings to transceiver unit 38, which is mounted on the vehicle. In one embodiment, each of the sensor units 30-36 establishes a half-duplex wireless link with transceiver unit 38 that enables two-way communication between the wheel-mounted sensor unit and the vehicle-mounted transceiver unit, although other types of two-way communication could also be used. It should be appreciated that it is not necessary to establish a bi-directional half-duplex wireless link between these components, as some instances may only require a one-way communication link, as is known in the art. Each sensor unit 30-36 may be used to replace a traditional rubber valve stem and, in an exemplary embodiment, includes a sensing element 50, sensor circuitry 52, an antenna 54, and a power source 56. It should be appreciated that any number of additional components, devices, circuits, etc. that are known in the art could also be used. The following description is provided in the context of sensor unit 30, but can apply to sensor units 32-36 as well.

Sensing element 50 measures tire pressure and generates readings that can be processed, saved, analyzed and/or transmitted by sensor unit 30. Sensing element 50 may be of the type that is in direct communication with the air inside of the tires (a so-called direct TPM system), or of the type that does not directly sense the air pressure within the tire but instead determines it based on one or more additional parameters, like wheel rotational speed (a so-called indirect TPM system). In the case of a direct TPM system, a variety of suitable mounting configurations could be used. These include mounting sensing element 50 in the end of a valve stem or mounting it in a steel band that extends around the rim of the wheels, to name a few. In one particular embodiment, sensing element 50 may be made in a glass-silicon-glass structure that holds a pressure sensitive membrane with one or more piezo resistive elements buried therein. An absolute pressure reference can be given by a vacuum chamber implemented in the top glass, for example. It should be appreciated that sensing element 50 may also sense temperature, displacement, velocity, acceleration or any other suitable parameter, and is not limited to tire pressure sensing only.

Sensor circuitry 52 receives input from sensing element 50 and may engage in two-way communication with transceiver unit 38, which is located at vehicle 20. According to the particular embodiment shown here, sensor circuitry 52 is electronically connected to sensing element 50 and antenna 54 and includes a processing unit 60, a wireless unit 62, and memory 64. With these components, sensor circuitry 52 may establish a half-duplex wireless link with transceiver unit 38 so that two-way communication can occur between them; as mentioned above, one-way communication is also possible. Depending on the particular application, it is also possible to provide sensor circuitry 52 and transceiver unit 38 in a manner that supports a full-duplex wireless link or some other form of two-way wireless communications.

Processing unit 60 can process information from a number of different sources and preferably includes one or more suitable components, such as a microprocessor, a microcontroller, an application specific integrated circuit (ASIC), or any other suitable device known in the art. Processing unit 60 may be assigned a variety of tasks, including packaging sensor readings from sensing element 50 into a suitable data format that can be provided to wireless unit 62 for subsequent wireless transmission. When sensor circuitry 52 is being used in a receiving capacity, as will be explained, processing unit 60 may be used to process and interpret incoming messages from transceiver unit 38. These are only some of the tasks and functions that processing unit 60 may perform, as skilled artisans will appreciate that it could be used in many other capacities as well.

Wireless unit 62 may perform a number of tasks pertaining to the transmission and/or reception of wireless signals between the wheel-based sensor unit 30 and the vehicle-based transceiver unit 38. In an exemplary embodiment, wireless unit 62 participates in the transmission and reception of radio frequency (RF) signals and can make configuration and other changes to different wireless settings, such as modulation schemes. These changes can be made at the software and/or hardware level and may modify the functionality of the communication devices. For instance, wireless unit 62 may receive a data packet containing sensor readings from processing unit 60, modulate the data packet information onto a particular carrier frequency, up-convert the modulated signal to an appropriate radio frequency, and broadcast the resultant RF signal to transceiver unit 38 at a suitable power level. The modulation/demodulation, data encoding/decoding and error correction schemes, carrier frequency, radio frequency, signal transmission level, or any other appropriate wireless setting may be modified or changed by wireless unit 62; such a modification could result in a change to the configuration of the half-duplex wireless link established between sensor unit 30 and transceiver unit 38, for example. As will be explained, configuration changes may be initiated by transceiver unit 38 in response to adverse operating conditions, like noisy environments with lots of electromagnetic interference (EMI), and can be sent to the various sensor units 30-36 over the half-duplex wireless link. A 'wireless setting' broadly includes any setting, parameter, configuration, mode, scheme, etc. that affects the particular way in which wireless communication is performed between the transceiver unit and one or more of the sensor units. Modulation/demodulation, data encoding/decoding and error correction schemes, carrier frequencies, radio frequencies, and signal transmission levels are some examples of wireless settings.

Memory 64 may store various pieces of data, information, wireless settings, software, firmware, etc., and can be accessed by the different components of TPM system 10. In one example, memory 64 stores readings taken by sensing element 50, electronic instructions used to control processing unit 60, and/or information pertaining to the various wireless settings that are available for selection. These are, of course, only some of the items that could be stored at memory 64, as skilled artisans will know of many other potential uses.

Antenna 54 is electronically coupled to sensor circuitry 52, particularly wireless unit 62, and aids in the transmission and reception of wireless signals. In one exemplary embodiment, antenna 54 is an RF antenna and is integrated into a valve stem that functions as both an air valve for the tire and as an antenna for transmitting and receiving encoded RF information. Depending on where the vehicle is likely to be used, antenna 54 may transmit and receive signals over ultra high frequency (UHF) signals, which are part of the RF range (e.g., 315 MHz in the United States and 433 MHz in Europe). Other embodiments of antenna 54 could also be used.

Power source 56 powers the components of sensor unit 30 and may include any suitable power source known in the art. In an exemplary embodiment, power source 56 includes a non-replaceable battery with an expected lifetime of around ten years. Because of the finite lifetime of such a power source, efforts should be made to save battery consumption and prolong its life. In another embodiment, power source 56 is a passive device that derives its energy from wireless transmissions sent to the sensor unit; energy associated with the wireless transmissions is harnessed and stored by power source 56. The preceding examples are only two exemplary possibilities that could be used, as others are certainly possible.

Transceiver unit 38 is located on vehicle 20 and may be electronically connected to any number of different vehicle electronic modules, such as modules 70-72, and wirelessly connected to sensor units 30-36. According to an exemplary embodiment, transceiver unit 38 includes an RF transceiver and a signal processing subsystem or module for communicating with sensor units 30-36 over the low power, two-way wireless link mentioned above. Other wireless communication techniques could also be used to facilitate wireless communication between these components. Transceiver unit 38 may be integrated or combined with another device in the vehicle, such as a remote function actuator (RFA) 74, it may be a stand alone module, or it may be implemented according to some other arrangement known in the art, for example. RFAs can be used for remote keyless entry (RKE) and vehicle theft deterrent (VTD) systems. It should be appreciated that transceiver unit 38 may include any combination of electronic components and devices known in the art, including an antenna 78, an exemplary communications circuitry 80 having a processing unit 82, a wireless unit 84, and memory 86. Components 82-86 could be similar to those described in conjunction with sensor unit 30, or they could be different in order to accommodate the needs of a vehicle-mounted module. Transceiver unit 38 may also have an I/O device 88 for connecting the transceiver unit to a vehicle bus 90 or other vehicle communications network, as well as other components like a fully integrated voltage controlled oscillator (VCO), an intermediate frequency (IF) filter, a phase-locked loop (PLL) circuit, a demodulator, a loop filter, etc.

It should be appreciated that the general operation of a TPM system is known in the art. Thus, a recitation of the known general operation is not provided here. TPM system 10 may be used with any number of wheel-mounted sensor units 30-36, and is not limited to use with four sensor units only. For instance, the TPM system could interact with one, two or three sensor units, or it could interact with more than four sensor units, such as the case of a tractor trailer or the like. In some cases, TPM systems use a low frequency wireless signal (e.g., 125 KHz) to program the wheel-mounted sensor units when the vehicle is being manufactured and before it has left the manufacturing facility. This type of one-way communication typically takes place between a piece of electronic equipment at the manufacturing facility and the sensor units.

Figure 3:
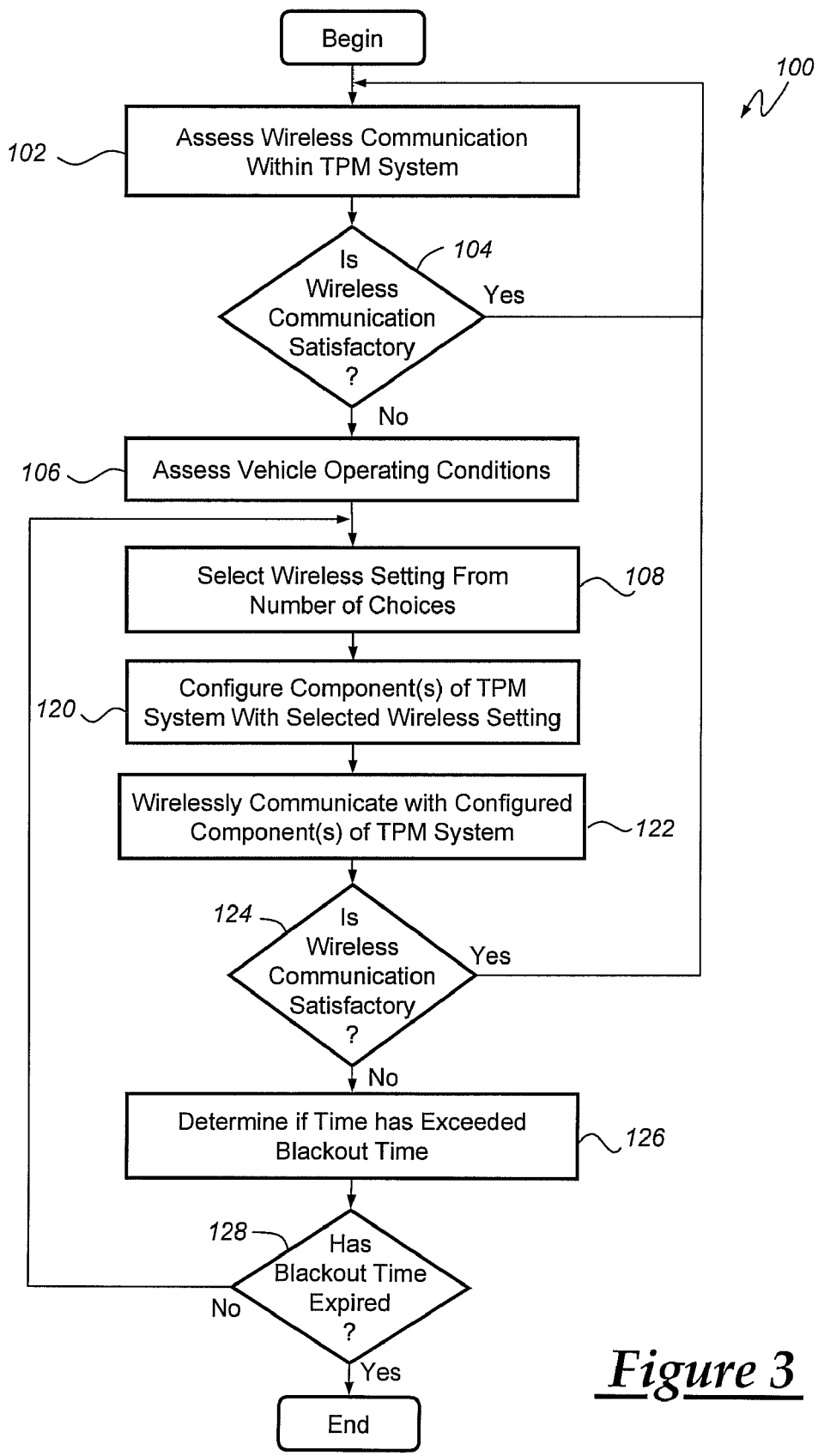
FIG. 3 is a flowchart illustrating some of the steps of an exemplary method for operating a TPM system, such as the exemplary TPM system shown in FIGS. 1 and 2.

Turning to FIG. 3, there is shown an exemplary embodiment of a method 100 for operating a TPM system, such as the one previously described. TPM system 10 may operate in a variety of modes; during certain modes, method 100 may be triggered. For instance, method 100 could be initiated from a drive mode, a stationary mode, or a re-measure mode, to cite a few examples. The preceding modes of operation are simply exemplary, as method 100 could be triggered or initiated from one of any number of different operational modes or states, including ones other than those mentioned above.

Beginning with step 102, the method assesses wireless communication within TPM system 10. In a particular embodiment, step 102 assesses the quality and/or reliability of the wireless communication link by continuously monitoring the success of information packets sent from sensor units 30-36 to transceiver unit 38, while using timers and counters to facilitate monitoring. This may be performed by sensor units 30-36 and/or transceiver unit 38, and can be accomplished in a number of different ways. For instance, timers maintained at transceiver unit 38 may be used to keep track of incoming wireless communications from each of the sensor units 30-36. The timers may include any combination of timers, counters, or other hardware or software components capable of measuring time. If a wireless signal is successfully received from a particular sensor unit, then the timer associated with that sensor unit could be reset and steps 102, 104 could repeat without making any configuration changes to the wireless link (generally, there is no need to make configuration changes if the wireless communication is satisfactory). If the timer expires before transceiver unit 38 receives an acceptable wireless communication, then step 104 may determine that one or more aspects of the wireless communication with that particular sensor unit are not satisfactory. Other methods, including techniques that evaluate the signal strength and/or other characteristics, techniques that are performed jointly by the sensor units and the transceiver unit, etc. could also be used to assess the wireless communications.

In step 106, the method assesses one or more vehicle operating condition(s), which can include conditions that are both external and internal to vehicle 20. These operating conditions may be monitored on a regular basis to help assess the quality and/or reliability of the wireless communication link. External operating conditions broadly include any conditions outside of the vehicle that may affect wireless communication within TPM system 10. Examples of some external operating conditions include electromagnetic interference (EMI) from external non-vehicle sources (e.g., EMI from radio towers, etc.), EMI from external vehicle sources (e.g., excessive EMI from other TPM systems on nearby vehicles), geographical and topographical conditions (e.g., driving in a tunnel), traffic patterns and vehicle density (e.g., the number of vehicles within a certain proximity), etc. Internal operating conditions include any conditions inside of the vehicle that may affect wireless communication with TPM system 10, and they can be further divided into static and dynamic conditions. Static conditions include internal operating conditions that generally do not change; an example is the location of transceiver unit 38 relative to sensor units 30-36. Dynamic conditions include internal operating conditions that generally do change; examples include the number of occupants or luggage in the vehicle (objects like a person's body can affect certain wireless transmissions), the amount of intra-vehicle EMI, the current power level of power source 56 located at the sensor units, wireless settings, the speed of the vehicle, as well as other loading conditions that could affect wireless signal propagation between the sensor units and the transceiver unit.

It should be appreciated that external and/or internal operating conditions can be assessed or measured by sensor units 30-36 and then broadcast to transceiver unit 38, they could be assessed by the transceiver unit itself, they could be assessed by some other sensor or module located on the vehicle, or they can be determined by some other appropriate device. Any combination of these internal and/or external operating conditions, as well as others, may be assessed and used with the present method. Furthermore, the assessment of vehicle operating conditions may be limited to the most recently acquired data, or it could also consider previously recorded data.

In step 108, a wireless setting may be selected from a number of choices and may be at least partially based on the vehicle operating conditions previously sensed. In one embodiment, if a wireless communication link with a specific sensor unit 30-36 is lacking in terms of quality, reliability, etc., then step 108 can identify the most suitable and optimal set of parameters to establish a new wireless communication link. As previously mentioned, a 'wireless setting' broadly includes any setting, parameter, configuration, mode, scheme, etc. that affects the particular way in which wireless communication is performed between the transceiver unit and one or more of the sensor units. Examples of some wireless settings that are available for manipulation include modulation/demodulation, encoding/decoding and error correction schemes, carrier frequencies, radio frequencies, signal transmission levels, frames per packet, inter-arrival time durations for frames, number of identical packets to be transmitted, noise floor levels, packet transmission frequencies, etc. In an exemplary embodiment, step 108 uses an intelligent algorithm to assess the wireless communication links and the vehicle operating conditions, to reconfigure the functionality of the software and/or hardware of TPM system 10, and to choose the most suitable wireless settings for improved wireless communication. These actions may be performed in real-time, they may be performed at one or more of the tire-mounted sensor units 30-36, at the vehicle-mounted transceiver unit 38 or elsewhere in the vehicle, and they may be performed with or without the use of the bi-directional communication capabilities of the architecture, to name a few possibilities.

For instance, consider the situation where one of the sensor units 30-36 reports a low power source level to transceiver unit 38. This particular operating condition may cause TPM system 10 to refer to a database, look-up table, or other data structure, and to select a new wireless setting by changing the number of redundant frames per packet from six to three (such a change would result in less power usage by the sensor unit). In another example, transceiver unit 38 may sense a weak signal coming from one or more of the sensor units 30-36. In response, transceiver unit 38 may instruct sensor unit 30 to increase its transmit power level by a certain amount; this too, constitutes a wireless setting selection and change. In yet another example, step 108 may determine that the particular operating conditions justify changing the modulation scheme from amplitude shift keying (ASK) to quadrature phase shift keying (QPSK). In step 108, selection and modification of one or more wireless setting(s) could be based on the use of a lookup table that has been built, maintained, and refined by the vehicle over time, or it could be based on the quantified results generated by a formula, for example. The PER formula described later is one example of such a formula, however, other uses of probability theory to quantify the desired quality level of the wireless communication links could also be employed. If a database or look-up table is not available, method 100 could generate such a data structure by using a software script to generate one in real-time using the results of the assessments in steps 102 and 106, as well as other data. This type of data structure could be refined and improved over time such that the system evolves and improves.

Once a wireless setting has been selected, step 120 configures one or more components of TPM system 10. In an exemplary embodiment, the configuration changes are made in real-time, they are made to hardware and/or software components of the system, and they are made to transceiver unit 38 and/or one or more of the sensor units 30-36. The TPM system 10 could generate and broadcast wireless messages to instruct one or more sensor units 30-36 to reconfigure their individual functionality accordingly. The half-duplex wireless link described above may be used for this purpose, as it provides a two-way link so that real-time feedback can be provided from sensor units 30-36 and wireless setting changes can be made by transceiver unit 38. The real-time feedback and corresponding wireless setting changes could be made in order to adapt on-the-fly to the operating conditions assessed in step 106, for example, thus enabling TPM system 10 to reconfigure itself without stopping the system. It should be appreciated that the wireless setting selections and changes could apply to all of the sensor units 30-36 uniformly, or each sensor unit could be configured independently.

Next, step 122 attempts to wirelessly communicate between the newly configured components of TPM system 10. In the example above where the modulation scheme was changed from ASK to QPSK, step 122 could attempt to transmit under these new wireless settings by sending one or more signals from sensor units 30-36 to transceiver unit 38, where the wireless transmissions were configured according to a QPSK modulation scheme. If a wireless transmission is successfully received at transceiver unit 38 (e.g., the quality and/or reliability of a tire pressure reading is sufficient), then step 124 may assume that a successful configuration change has been made and control of the method can return to step 102. If the configuration changes do not result in a successful wireless transmission, then the method may determine other wireless setting changes should be tried. However, before any additional wireless setting changes are made, the method could check to see if a blackout time has expired, step 128.

In an exemplary embodiment, a blackout timer can be set according to a Packet Error Rate (PER) algorithm. A timer threshold—also referred to as a 'blackout time'—is representative of the maximum time allowed without successful communication between transceiver unit 38 and sensor units 30-36. If a timer threshold expires without the transceiver unit successfully receiving a signal from a sensor unit, then TPM system 10 assumes that an error has occurred and sends the driver a warning indicating as much. It is desirable to minimize the number of error messages sent to the driver; thus, if possible, method 100 attempts to fix the wireless link before having to send error messages. The PER algorithm can provide desired levels of performance and reliability in the form of a PER value, which can be manipulated to produce a blackout time, for example. An exemplary PER algorithm is:

$$PER = [(P/PPM)/((MTW)*(D)*(H)*(M))]^{(1/P)}$$

Where
P=number of packets transmitted within a threshold blackout time (TBT)
PPM=number of packets transmitted per minute
TBT=threshold blackout time (minutes)=P/PPM
MTW=mean time to warning; average time the threshold blackout time is reached (years)
D=average number of days per year the vehicle is driven
H=average number of hours per day the vehicle is driven
M=minutes per hour=60

The PER formula may be used for a variety of purposes. In one example, the PER algorithm can establish one of the criteria for selecting an appropriate corrective action in case there is unsatisfactory communication between sensor units 30-36 and transceiver unit 38. In another example, the PER algorithm is able to dynamically establish different blackout times based on different factors. Dynamic blackout times enable real-time decision making regarding the desired performance level of the system. It should be appreciated that usage of the PER algorithm is optional, and that method 100 could instead rely on predetermined static timer thresholds that are already set, for example. It is worth noting, the exemplary timers mentioned in conjunction with steps 102-104 could be based on a calculated blackout time. For instance, if a blackout time is set to 15 minutes, then the timer used in step 102 to check for satisfactory or acceptable communications could be set to 50% of the calculated blackout time (i.e., 7.5 minutes) or to some other value that is relative to the blackout time. Other uses of probability theory and other mathematical techniques could be used to quantify certain aspects of the TPM system functionality, as the above-provided PER formula is only one example.

If step 128 determines that the blackout time has not expired, then the method can circle back to step 108 so that a new wireless setting can be selected and tried. In the example above where the modulation scheme was changed, in a second time around step 108 could instead select and modify a new wireless setting (e.g., the transmission power of the wireless signals could be adjusted). An iterative process such as this may continue until step 128 successfully receives a satisfactory communication or until the blackout time has expired. If the blackout time expires, step 130 can send an error message to the driver in the form of a visual warning, an audible message, or as some other indication.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the exemplary method shown in FIG. 3 and described above could include any combination of steps and is not limited to the particular combination of exemplary steps shown there, nor is it limited to the particular order of steps shown there. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a tire pressure monitoring (TPM) system for a vehicle, comprising the steps of:
   (a) assessing wireless communication within the TPM system;
   (b) if the wireless communication is not satisfactory, then assessing one or more vehicle operating conditions that affect wireless communication within the TPM system and selecting a new wireless setting from a plurality of choices, the selection of the new wireless setting is based at least partially on the assessed vehicle operating condition;
   (c) configuring a component of the TPM system with the newly selected wireless setting; and
   (d) wirelessly communicating with the newly configured component of the TPM system.

2. The method of claim 1, wherein step (a) further comprises assessing wireless communication within the TPM system by using one or more timer(s) to keep track of wireless signals that are successfully received from the component of the TPM system.

3. The method of claim 1, wherein the wireless setting includes at least one setting selected from the group consisting of: a modulation setting, a data encoding/decoding setting, an error correction setting, or a transmission power setting.

4. The method of claim 1, wherein the vehicle operating condition includes at least one condition selected from the group consisting of: electromagnetic interference (EMI) from external non-vehicle sources, EMI from external vehicle sources, geographical and topographical conditions, traffic patterns and vehicle density, the location of a transceiver unit within the vehicle, the number of occupants in the vehicle, loading conditions in the vehicle, EMI from internal vehicle sources, a power level of a power source located at a sensor unit, a wireless setting, or a speed of the vehicle.

5. The method of claim 1, wherein step (c) further comprises configuring a sensor unit located at a vehicle wheel and a transceiver unit located at the vehicle, wherein the sensor unit and the transceiver unit are configured with the same wireless setting.

6. The method of claim 5, wherein step (c) further comprises configuring a plurality of sensor units located at a plurality of vehicle wheels with the same wireless setting.

7. The method of claim 5, wherein step (c) further comprises configuring a plurality of sensor units located at a plurality of vehicle wheels with different wireless settings.

8. The method of claim 1, wherein step (d) further comprises wirelessly communicating with the component, wherein the wireless communication is over a half-duplex wireless link established between a sensor unit located at a vehicle wheel and a transceiver unit located at the vehicle.

9. The method of claim 1, wherein step (b) further comprises measuring one or more vehicle operating conditions with a sensor and using an intelligent algorithm to select a new wireless setting, the selection of the new wireless setting by the intelligent algorithm is based at least partially on the vehicle operating condition provided by the sensor.

10. The method of claim 1, wherein step (b) further comprises measuring one or more vehicle operating conditions with a sensor and using a look-up table or database to select a new wireless setting, the selection of the new wireless setting by the look-up table or database is based at least partially on the vehicle operating condition provided by the sensor.

11. The method of claim 1, wherein step (b) further comprises using a sensor unit located at a vehicle wheel to select a new wireless setting, step (c) further comprises configuring the sensor unit at the vehicle wheel with the newly selected wireless setting, and step (d) further comprises sending a wireless signal from the newly configured sensor unit at the vehicle wheel to a transceiver unit located at the vehicle.

12. The method of claim 1, wherein step (b) further comprises using a transceiver unit located at the vehicle to select a new wireless setting, step (c) further comprises configuring the transceiver unit at the vehicle with the newly selected wireless setting, and step (d) further comprises sending a wireless signal from the newly configured transceiver unit at the vehicle to a sensor unit located at the vehicle wheel.

13. A tire pressure monitoring (TPM) system for a vehicle, comprising:
   a sensor unit that is mounted on a vehicle wheel and can both send and receive wireless communications;
   a transceiver unit that is mounted on the vehicle and can both send and receive wireless communications; and
   a half-duplexed wireless link established between the sensor unit and the transceiver unit, wherein the half-duplexed wireless link is configured with at least one wireless setting that is selected on the basis of a current vehicle operating condition that can affect wireless communication within the TPM system.

14. A method of operating a tire pressure monitoring (TPM) system for a vehicle, comprising the steps of:
   (a) assessing wireless communication within the TPM system;
   (b) if the wireless communication is not satisfactory, then selecting at least one new wireless setting from the group consisting of: a modulation setting, a data encoding/decoding setting, an error correction setting, or a transmission power setting;
   (c) configuring a component of the TPM system with the newly selected wireless setting; and
   (d) wirelessly communicating with the newly configured component of the TPM system.

15. The method of claim 14, wherein step (a) further comprises assessing wireless communication within the TPM system by using one or more timer(s) to keep track of wireless signals that are successfully received from the component of the TPM system.

16. The method of claim 14, wherein step (b) further comprises assessing one or more vehicle operating conditions that affect wireless communication within the TPM system and selecting the new wireless setting based at least partially on the assessed vehicle operating conditions.

17. The method of claim 16, wherein the operating condition includes at least one condition selected from the group consisting of: electromagnetic interference (EMI) from external non-vehicle sources, EMI from external vehicle sources, geographical and topographical conditions, traffic patterns and vehicle density, the location of a transceiver unit within the vehicle, the number of occupants in the vehicle, loading conditions in the vehicle, EMI from internal vehicle sources, a power level of a power source located at a sensor unit, a wireless setting, or a speed of the vehicle.

18. The method of claim 14, wherein step (c) further comprises configuring a sensor unit located at a vehicle wheel and a transceiver unit located at the vehicle, wherein the sensor unit and the transceiver unit are configured with the same wireless setting.

19. The method of claim 18, wherein step (c) further comprises configuring a plurality of sensor units located at a plurality of vehicle wheels with the same wireless setting.

20. The method of claim 18, wherein step (c) further comprises configuring a plurality of sensor units located at a plurality of vehicle wheels with different wireless settings.

21. The method of claim 14, wherein step (d) further comprises wirelessly communicating with the component, wherein the wireless communication is over a half-duplex wireless link established between a sensor unit located at a vehicle wheel and a transceiver unit located at the vehicle.

22. The method of claim 14, wherein step (b) further comprises measuring one or more vehicle operating conditions with a sensor and using an intelligent algorithm to select a new wireless setting, the selection of the new wireless setting by the intelligent algorithm is based at least partially on the vehicle operating condition provided by the sensor.

23. The method of claim 14, wherein step (b) further comprises measuring one or more vehicle operating conditions with a sensor and using a look-up table or database to select a new wireless setting, the selection of the new wireless setting by the look-up table or database is based at least partially on the vehicle operating condition provided by the sensor.

24. The method of claim 14, wherein step (b) further comprises using a sensor unit located at a vehicle wheel to select a new wireless setting, step (c) further comprises configuring the sensor unit at the vehicle wheel with the newly selected wireless setting, and step (d) further comprises sending a wireless signal from the newly configured sensor unit at the vehicle wheel to a transceiver unit located at the vehicle.

25. The method of claim 14, wherein step (b) further comprises using a transceiver unit located at the vehicle to select a new wireless setting, step (c) further comprises configuring the transceiver unit at the vehicle with the newly selected wireless setting, and step (d) further comprises sending a wireless signal from the newly configured transceiver unit at the vehicle to a sensor unit located at the vehicle wheel.

* * * * *